Patented Dec. 21, 1937

2,102,617

UNITED STATES PATENT OFFICE 2,102,617

SYNTHETIC RESINS

John D. Farber, Philadelphia, Pa., assignor to Management and Research, Inc., Philadelphia, Pa., a corporation of Delaware No Drawing. Application May 25, 1934, Serial No. 727,523

2 Claims. (Cl. 260—4)

This invention relates to certain improvements in synthetic resins, and to the processes or methods of producing the same; and the nature and objects of the invention will be readily understood and appreciated by those skilled in the arts to which the invention relates, in the light of the following explanation and detailed description of examples of the resins and of the processes of producing the same, from among various other resin products and the ingredients and their relative proportions utilized in their production, and other processes and the steps thereof followed in producing the same, of which my invention is capable and which it includes within the spirit and the scope thereof.

My invention is primarily directed to and has made possible the production of a novel synthetic resin that is hard, yet clear and water white, water repellent and insoluble in hot and cold water but readily soluble in certain of the common commercially obtainable and cheaper solvents, strongly repellent to oils and greases to the extent of being highly oil and grease proof, and particularly adaptable to use in forming films or sheets therefrom as well as for use with suitable fillers to form plastic masses for molded and the like materials; and further, my invention makes possible the production of such a resin having the foregoing fundamental characteristics from readily available low cost materials and ingredients without the necessity of special or expensive production apparatus and equipment.

In carrying out my invention to produce a resin having such general characteristics, I form the resin as a colloidal condensate resulting from the reaction between certain ingredients or materials while being treated or processed in accordance with the dictates of my invention; and a novel feature and characteristic resides in my fundamental discovery that the desired character of resin can be produced at relatively low cost with full control of the resultant resin and of its characteristics within limits, by the production separately of different characters of resins and the fluxing or mixing of such initial resins together while hot and in liquid form in the proportions as determined by the characteristics desired in the final resin product, while retaining for the final resin, when desired, the essential clear and water white characteristic.

Aside from the foregoing general results of the invention, I have found that a greater resin yield for given quantities of materials or ingredients may be expected so that the production costs are materially reduced accordingly; and in connection with such costs attention is directed to the fact that the initial or intermediate resins formed in carrying out and practicing my invention, if not all utilized in the production of the final resin, are not waste or lost products but are of utility and can be employed in fields suited to their characteristics.

As one example of a manner of practicing and carrying out my invention to produce a desired resin having the characteristics and in accordance with the general requirements of a resin of my invention, I first form and produce, in this instance, two initial or primary resins which I then later flux or mix in the manner hereinafter described to form the final resin.

One of the primary or initial resins of this example is produced by the reaction between the following ingredients in approximately the proportions as set forth in the following formula, although obviously such proportions may be varied within the ranges that will maintain the required characteristics for this primary resin:

| | Parts |
|---|---|
| Phenol | 50 |
| Formaldehyde | 50 |
| Relatively small quantity of oxalic acid | |

I mix the foregoing ingredients in a pressure container which may be of any of the usual types for this purpose, but of a suitable material or lining to have no effect on the desired characteristics of the resin, and heat the mixture for a suitable period of time near the boiling point, while stirring or agitating the mixture throughout the operation. The oxalic acid reacts quickly, acting as a catalyzing agent, and a resinous mass results from this treatment. Such mass is then washed with cold water and if permitted to cool, produces a hard but brittle resin that is clear and water white and soluble in alcohol and acetone. The resin so produced can, if desired, and when not used in the production of my final resin, be modified for use in solutions, or by plasticizing, or for moulding purposes.

In accordance with the present example of my invention, I produce a second so-called initial or primary resin for fluxing and mixing with the aforesaid resin by mixing and heating, while stirring or agitating the following ingredients in approximately the relative proportions by weight of the following formula:

| | Grams |
|---|---|
| Citric acid | 45 to 60 |
| Glycerine | 45 to 50 |
| Phthalic anhydride | 10 to 30 |

In producing the resin from the foregoing formula, I heat the citric acid and the glycerine in a container or vessel of a suitable material or lining that will have no effect on the characteristics of the resin produced, to a temperature of not over approximately 140° C. for a suitable period of time, and I then add the phthalic anhydride and increase the heat applied to a temperature of not over approximately 180° C. The mixture is subjected to this latter temperature for a suitable period of time, as, for example, a period of approximately fifteen (15) minutes. I then again raise the temperature of the mixture by subjecting it to an increase in heat of not over approximately 220° C. for a suitable period of time, and there results a resinous mass which when cooled is brittle and sticky but repellent to water while being soluble in alcohol and all of the higher alcohols. The mixtures are constantly stirred or agitated throughout the foregoing treatments and steps, and I have found such agitation or stirring necessary for the desired results in the resinous mass produced.

In the formation and production of my final resin having the desired characteristics, from the foregoing initial or primary resins, I form the two initial resins in separate containers of the types and materials or linings as above referred to, and after their formation and while they are still hot and in a liquid, freely flowable state, I run the desired relative quantities thereof into a third container, where they mix in intimate contact. Such container must also be formed of a suitable material or lined therewith that will have no harmful or undesired effect on the character of the resin. While the initial resins are mixing in this third container, I constantly agitate or stir the mixture, and then while the mixture is cooling I wash the same with cold water in order to remove all of the glycerine and fats therefrom which may have been left in the mixture and not boiled out during the prior steps of the process.

While the containers or vessels in which the primary or initial resinous masses are formed, as well as the container in which these masses are mixed and formed into the final resin product, must be of suitable material or lined therewith, as previously pointed out, attention is also directed to the fact that all pipe lines, valves, or other elements of the production apparatus in which the materials or resinous masses come in direct contact, should also preferably be of a suitable material that will not affect the characteristics of the various resultant resins.

A particular result of my discovery of the formation of a resin from the mixing of different characteristic resins while hot and in a liquid state and their treatment in accordance with the teachings of my invention, is that I can definitely and accurately control certain of the characteristics of the resultant final resin, by varying the relative proportions of the resinous masses that are mixed, yet without loss of the clear, water white characteristic of the resin. For example, control of the hardness characteristic or of the degree of water repulsion can be obtained with a high degree of precision in this manner.

The final resin which embodies my invention and which I produce in the manner and by the process as described, is clear and water white, hard insoluble in hot and cold water and water repellent. It is highly repellent to oils and greases to the extent of being highly oil and grease proof, yet is readily soluble in certain of the common and cheaper solvents. This resin so produced and having the above characteristics is particularly adapted for use in the manufacture of lacquers, paints, varnishes, waterproofing compounds and in the formation of films or sheets therefrom, as well as for the manufacture of thin, veneer fibre sheets. It is also particularly adapted for use with suitable fillers and such like materials to form plastic masses for moulding purposes.

It is also evident that various changes in proportions as well as substitutes of equivalent ingredients, might be resorted to in the examples hereinbefore specified, and similarly that steps of the processes as disclosed in the particular examples might be varied and changed, without departing from the fundamental principles and the scope of my invention, and hence I do not wish to limit my invention in all respects to the exact and specific disclosures hereof.

What I claim, is:—

1. Process of producing a synthetic resin which consists in: forming a resinous mass as a condensation product resulting from the reaction between phenol, formaldehyde and oxalic acid; simultaneously and separately forming another resinous mass as a condensation product resulting from the reaction between citric acid, glycerine and phthalic anhydride; then mixing said separate resinous masses prior to cooling thereof and while they are still in the liquid state; stirring the mixture as it is formed; and finally cooling the mixture to produce the completed resin.

2. Process of producing a synthetic resin which consists in; forming a resinous mass as a condensation product resulting from the reaction between approximately 50 parts of phenol, 50 parts of formaldehyde, and a small quantity of oxalic acid; simultaneously and separately forming another resinous mass as a condensation product resulting from the reaction between approximately 45 to 60 grams of citric acid, 45 to 50 grams of glycerine, and 10 to 30 grams of phthalic anhydride; then mixing said separate resinous masses prior to cooling thereof and before completion of the reaction while the masses are still in the liquid state; stirring the mixture of said masses as the mixture is formed; and finally cooling the mixture to produce the completed resin.

JOHN D. FARBER.